United States Patent Office 2,780,536
Patented Feb. 5, 1957

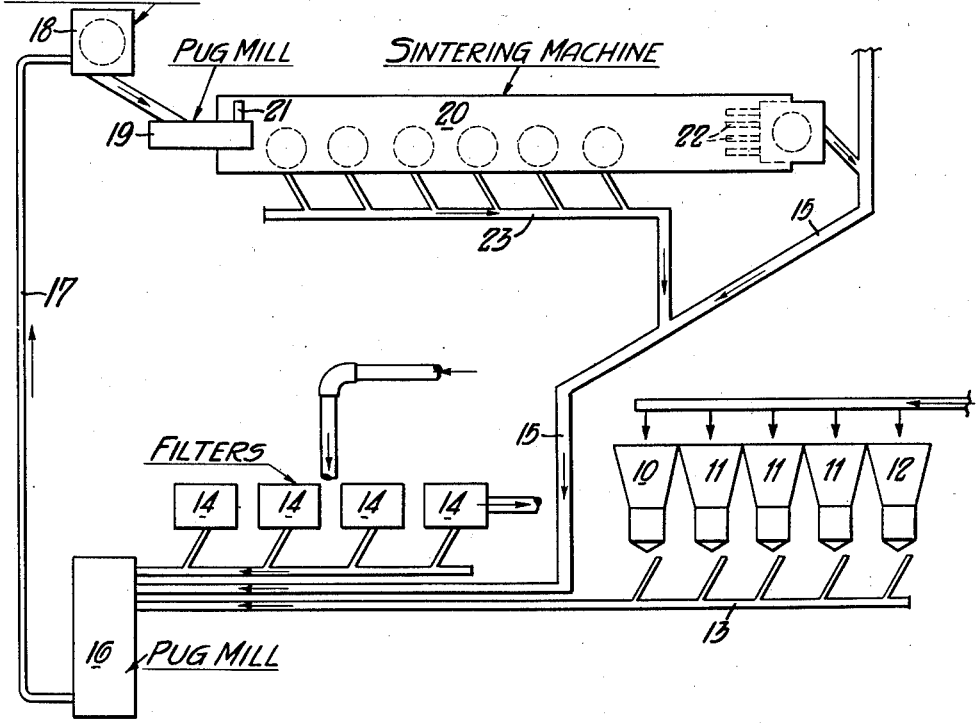

2,780,536
FLUE-DUST SINTER AND METHOD OF MANUFACTURE

Dennis J. Carney, Chicago, Ill., assignor to United States Steel Corporation, a corporation of New Jersey Application October 21, 1953, Serial No. 387,486

2 Claims. (Cl. 75—5)

This invention relates to the sintering of blast-furnace flue dust for recharging into the furnace.

The sintering of flue dust has long been practiced as well as the sintering of iron-ore fines. In sintering flue dust, a small proportion, usually less than 20%, of ore fines is added to the feed mix. By contrast, the mix for sintering ore usually contains from 40 to 70% of ore fines. The most important properties of sinter are strength and reducibility. Flue-dust sinter as produced heretofore has a lower strength than ore sinter. It is accordingly the object of my invention to produce flue-dust sinter having higher strength than that of the conventional product and this without impairing its reducibility or materially lowering the iron content.

I have discovered that the addition of a small amount of furnace slag to the mix used for sintering flue dust results in a product having a materially increased strength as well as good reducibility and an iron content not substantially lower than that of a conventional feed mix for flue-dust sinter. The slag may be either granulated blast-furnace slag or open-hearth slag fines, the particles of which are less than one-eighth inch in size. The amount of slag added may vary between 1 and 15% of the mix by weight, but is preferably about 8%. The slag is thoroughly mixed with the ore and flue dust making up the balance of the sinter feed and is then charged onto the traveling grate of a conventional sintering machine where it is ignited. The combustible component of the mix, i. e., granular carbon contained in the flue dust, burns under induced draft without supplemental fuel and, by the heat thus produced, the feed is agglomerated into sinter in the known manner.

A complete understanding of the invention may be obtained from the following detailed description and explanation which refer to the accompanying drawing illustrating the present preferred embodiment. In the drawing, the single figure is a flow chart showing diagrammatically the progress of the starting materials through the several processing steps by which they are converted to sinter.

Referring now in detail to the drawing, storage bins 10, 11 and 12 are provided with rotary tables for feeding their contents to a conveyor 13. Bin 10 contains iron ore fines, bins 11 contain dry blast-furnace dust and bin 12 contains granulated blast-furnace slag. Drum type filters 14 are arranged to treat the sludge settled from the water used in the blast-furnace gas washer, and to deliver the filter cake thus formed onto conveyor 13. In addition, fines from the sintering machine to be described later, are returned to conveyor 13 by a conveyor 15.

Conveyor 13 delivers the ore fines, flue dust, slag and sinter fines to a pug mill 16 for mixing. The supply of the several materials is controlled to give a mixture in the pug mill of about 5% ore, 10% sinter fines, 49% dry flue dust, 28% filter cake and 8% slag. On this basis, the slag amounts to about 10% or the total percentage of flue dust, the ore 6.5% and the sinter fines 13%. This mixture contains about 52% iron or only slightly less than the average figure of 56 to 59% for conventional sinter feed without slag. The exact iron content of the mixture may be varied by changing the amount of ore used. The amount of dry flue dust used determines the amount of carbon in the mixture since raw flue dust contains from 3 to 15% free carbon, generally in a finely divided state.

When the raw materials have been mixed in mill 16, the mixture is discharged onto a conveyor 17 by which it is transported to a bin 18 having a rotary feed table. From bin 18, stock is delivered to a final pug mill 19 for further mixing with sufficient water to provide a moisture content of from 10 to 12%. After passing through mill 19, the feed mixture is spread on the pallets of the traveling grate of a sintering machine 20 by a swinging spout 21. As the grate advances, the bed of material thereon is subjected to progressive ignition and combustion under induced draft, by known means. No supplemental fuel is added to the feed, the carbon contained in the flue dust furnishing sufficient combustible to sinter the particulate materials. At the discharge end of the machine, the sintered product falls onto a grizzly 22 and the fines therefrom are delivered to conveyor 15. Similarly the particles removed from the draft induced through the sintering machine by suitable collectors are delivered to conveyor 15 by a conveyor 23.

The larger pieces of sinter which do not pass through grizzly 22 are used as part of the ore charge for a blast-furnace. Such pieces have a substantially higher strength than conventional sinter. This increment of strength may be as much as 50%. A measure of the sinter strength is afforded by the median size of the particles after 200 revolutions in a tumbling barrel at 24 R. P. M. (See paper by E. C. Rudolphy and me entitled "Quality Control of Blast-furnace Flue-dust Sinter" presented at the Blast-furnace, Coke-oven and Raw-materials Conference of A. I. M. M. E., Buffalo, New York, April 20, 1953.) The following table gives the strength indices and the composition of a conventional sinter (A) and several typical examples (B, C, and D) of my improved sinter produced by the method described above:

Table

| Sample | Slag Addition, percent | Strength Index (Median Size, Inches) | Iron Oxides | Analysis | | |
|---|---|---|---|---|---|---|
| | | | | CaO | SiO$_2$ | Al$_2$O$_3$ |
| A | None | .19 | 80 | 2 | 11 | 3 |
| B | 7.5 | .27 | 75 | 5 | 13 | 3 |
| C | 11.5 | .30 | 71 | 7 | 15 | 4 |
| D | 19 | .35 | 69 | 9 | 17 | 4 |

A substantial number of tests on sinter made with the addition of 7.5% slag gave an average of .27" for the median-size strength index as compared to an average of .20" or .21" for conventional sinter. The size distribution of particles of my improved sinter after tumbling showed 95.7% larger than 20-mesh (.033") as compared to an average of 88% for conventional sinter.

While I do not wish to be bound by any theory as to the reason for the increased strength of my improved sinter, it apparently results from the fact that the granulated slag is intimately mixed with the iron-bearing components, quickly dissolves in the silica associated with the latter and has a relatively low melting point, thus affording improved bond on cooling after sintering.

The addition of an excessive amount of slag is objectionable because it gives too high a lime content to the glass bond of the sinter resulting in slaking and loss of strength with time. It also reduces the iron content of the sinter mix which should not be less than 50%. Generally, a slag addition of about 15% is the maximum which may be used without producing the undesired effects mentioned.

The invention has marked advantages in addition to the increased strength of the sinter. For example, it permits an increased production of sinter and affords improved working conditions in the sintering plant by reducing the amount of floating dust. A smaller amount of fines is produced so there is less material to be recycled. What is more important is that blast-furnaces using the improved sinter show an increase in daily iron production of as much as 6 or 7% or around 100 tons in the case of a furnace having a capacity of 1500 tons per day.

While I have disclosed the use of granulated blast-furnace slag in the foregoing explanation, I may also employ the slag from open-hearth furnaces after sizing it to about .125".

Although I have disclosed herein the preferred practice of my invention, I intend to cover as well any changes or modifications which may be made therein without departing from the spirit and scope of the invention.

I claim:

1. In a method of sintering materials containing iron oxide such as flue dust, iron ore and sinter fines, the steps including mixing about 5% iron ore, about 10% sinter fines, about 77% flue dust and about 8% furnace slag in particulate form, spreading the mix on a continuous traveling grate, and progressively igniting the combustible in the mix and effecting combustion thereof while traveling on the grate.

2. Sinter suitable for charging into blast-furnaces comprising agglomerated lumps composed of at least 70% iron oxides, and the remainder substantially lime, silica, and alumina, said sinter exhibiting on the average a median size of particles of about .27 inches after 200 revolutions in a tumbling barrel at 24 R. P. M.

References Cited in the file of this patent

UNITED STATES PATENTS

| Number | Name | Date |
|---|---|---|
| 516,710 | Sanders | Mar. 20, 1894 |
| 708,331 | Elbers | Sept. 2, 1902 |
| 801,143 | Esch | Oct. 3, 1905 |
| 833,005 | Steinberg | Oct. 9, 1906 |
| 978,971 | Whitman | Dec. 20, 1910 |
| 1,041,363 | Souther | Oct. 15, 1912 |
| 1,114,030 | Payne | Oct. 20, 1914 |
| 1,847,596 | Cavers et al. | Mar. 1, 1932 |
| 1,930,010 | Haswell et al. | Oct. 10, 1933 |
| 2,131,006 | Dean | Sept. 20, 1938 |
| 2,243,785 | Udy | May 27, 1941 |
| 2,248,180 | Moriarty | July 8, 1941 |
| 2,373,244 | Holz | Apr. 10, 1945 |

FOREIGN PATENTS

| Number | Country | Date |
|---|---|---|
| 603,366 | Great Britain | June 15, 1948 |
| 642,339 | Great Britain | Aug. 30, 1950 |